United States Patent [19]

Grant et al.

[11] Patent Number: 4,564,165

[45] Date of Patent: Jan. 14, 1986

[54] ATTACHING DEVICE

[75] Inventors: Edward L. Grant, Jackson County, Mo.; Earl E. Stops; Edward Saltz, both of Waukesha County, Wis.

[73] Assignee: Hallmark Cards, Inc., Kansas City, Mo.

[21] Appl. No.: 480,718

[22] Filed: Mar. 31, 1983

[51] Int. Cl.⁴ .............................................. B42F 13/00
[52] U.S. Cl. ........................................ 248/343; 52/39; 248/317
[58] Field of Search ............... 248/343, 342, 317, 237, 248/220.2, 224.3, 489, 228; 52/27, 39, 484; 339/22 T; 191/23 A

[56] References Cited

U.S. PATENT DOCUMENTS

| | | | |
|---|---|---|---|
| 3,190,604 | 6/1965 | Jorgensen et al. | 248/343 |
| 3,277,622 | 10/1966 | Jensen | 52/484 |
| 3,346,909 | 10/1967 | Blackburn | 248/343 |
| 3,796,405 | 3/1974 | Rystand | 248/489 |
| 4,016,961 | 4/1977 | Howell | 191/23 A |
| 4,135,692 | 1/1979 | Fergunson | 248/317 |
| 4,137,424 | 1/1979 | Hesse et al. | 191/23 A |
| 4,412,107 | 10/1983 | Hillmann | 191/23 A |

Primary Examiner—Ramon S. Britts
Assistant Examiner—Ramon O. Ramirez
Attorney, Agent, or Firm—Neuman, Williams, Anderson & Olson

[57] ABSTRACT

A device is provided for attaching a depending unit (e.g., a poster) to a ceiling wherein the latter includes a support having an exposed flange. The depending unit has a thin upper peripheral segment with means for adjustment from a first mode to a second mode. The device has an elongated member provided with an elongated interior cavity accessible through an elongated narrow opening formed in the exposed surface thereof. The opening is sized to permit the unit upper peripheral segment to pass therethrough only when the means is in the first mode. When the unit upper peripheral segment is disposed within the cavity of the elongated member, the means assumes a second mode whereby the elongated member and said unit are retained in attached relation. The device is provided with an element which engages a concealed surface portion of the elongated member and coacts with the exposed flange of the ceiling support and secures the elongated member thereto.

5 Claims, 13 Drawing Figures

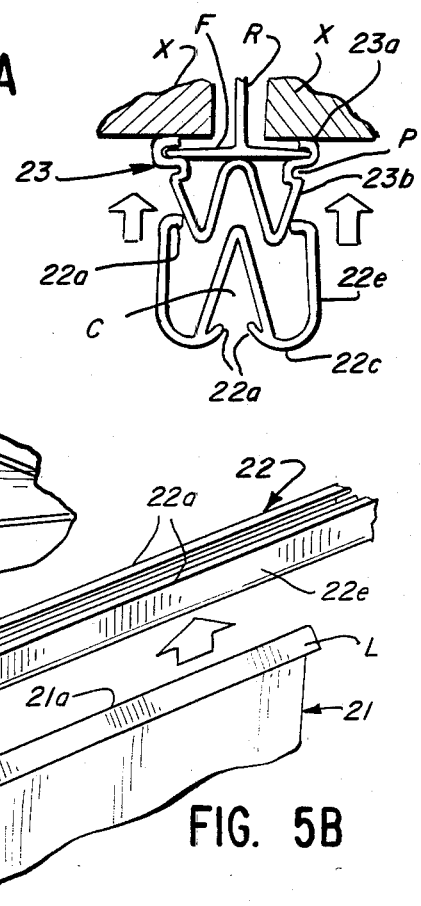
FIG. 5A
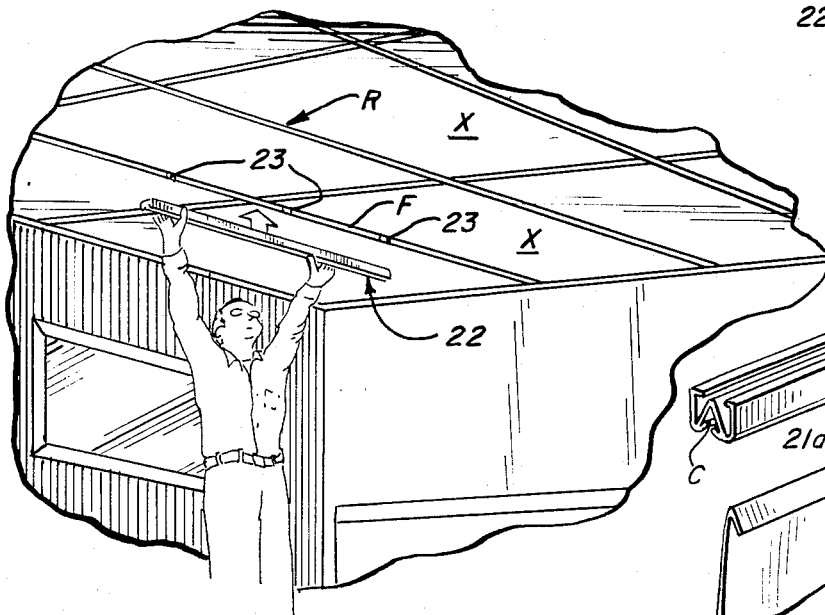
FIG. 5
FIG. 5B
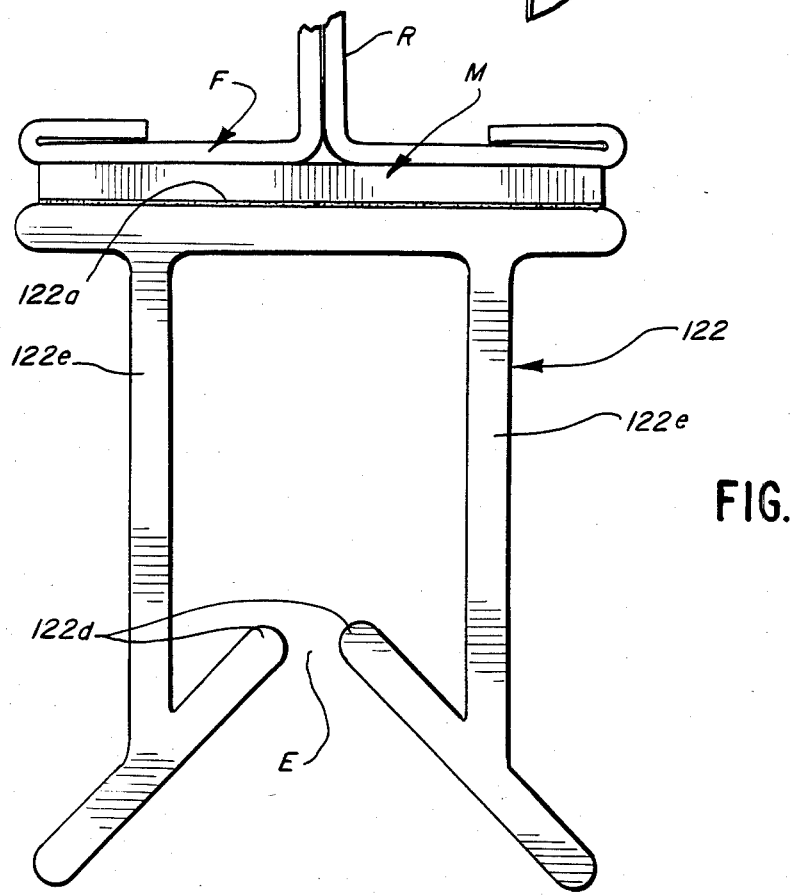
FIG. 6

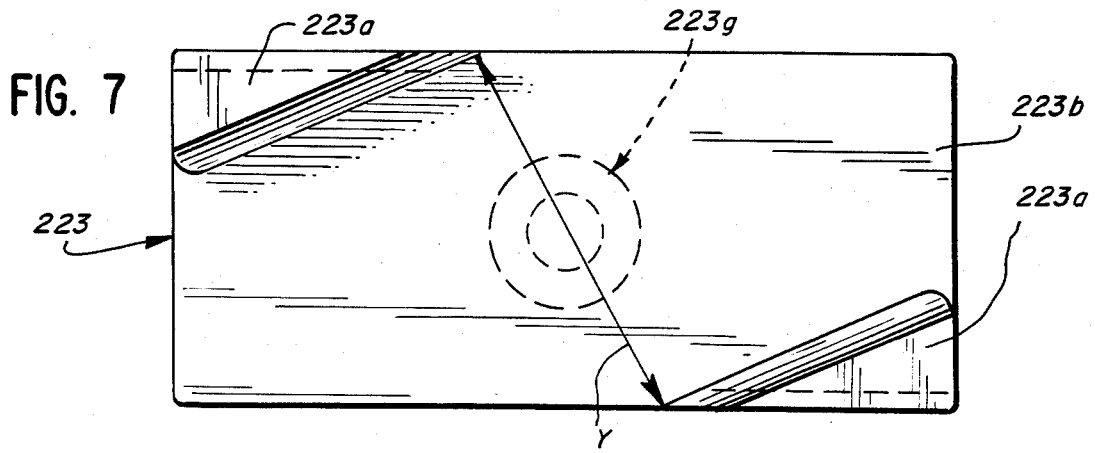
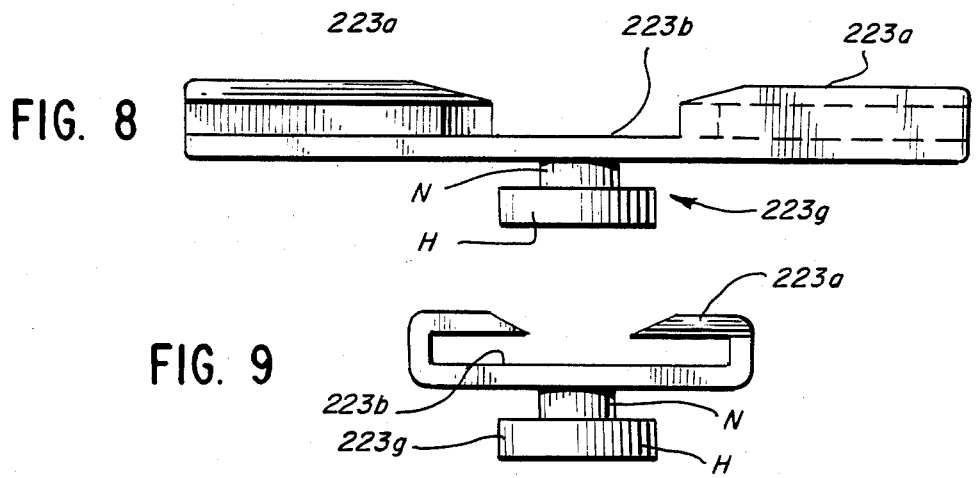
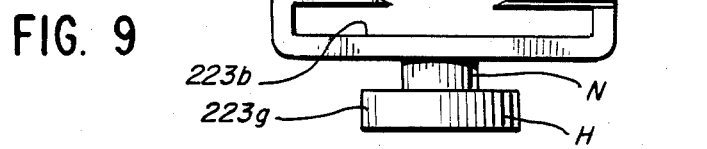
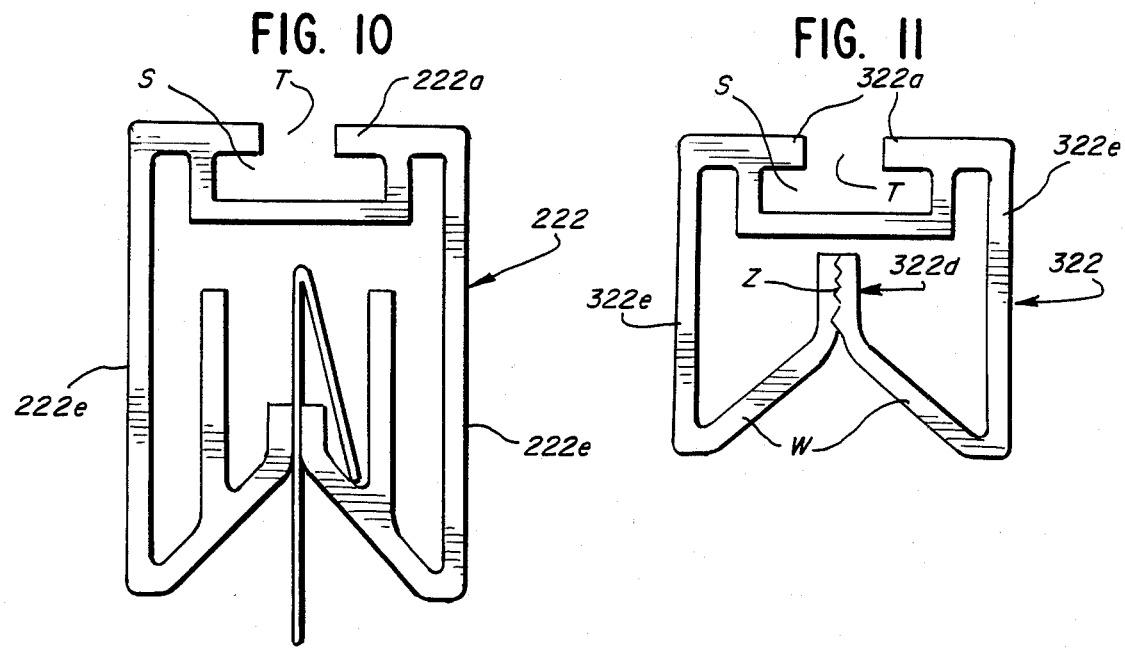

ATTACHING DEVICE

BACKGROUND OF THE INVENTION

Oftentimes in promoting a particular sales event or for decorative reasons, a retailer will utilize various posters, banners, mobiles, etc., which are suspended from the ceiling of the retail store. Heretofore, thumb tacks, staples, adhesive, and the like were utilized to attach the depending unit to the ceiling. Such methods, however, were unsatisfactory because they required special tools; frequently caused the unit and/or the ceiling to be defaced due to tearing or scarring; and after a short period of time the adhesive lost its bonding qualities.

SUMMARY OF THE INVENTION

Thus, it is an object of the invention to provide an attaching device which avoids all of the aforenoted shortcomings besetting prior methods and devices utilized for this purpose.

It is a further object of this invention to provide an attaching device which may be readily installed in a ceiling or removed therefrom without the need for tools and without scarring or defacing the ceiling or depending unit.

It is a further object to provide a device of the type described which is capable of being reused repeatedly.

It is a still further object to provide an attaching device which is of simple, compact construction; has an esthetic appearance; and is capable of accommodating a variety of depending units.

Further and additional objects will appear from the description, accompanying drawings, and appended claims.

In accordance with one embodiment, a device of the type described is provided which is adapted to attach a depending unit to a ceiling having a support with an exposed flange. The depending unit has a thin upper peripheral segment with means which is adapted to be adjusted from a first mode to a second mode. The device includes an elongated member having an elongated interior cavity formed therein. An exposed surface portion of the elongated member has an elongated narrow opening formed therein providing access to the interior cavity. The opening is sized to permit the upper peripheral segment of the depending unit to pass therethrough only when the means is in second mode. Once the upper peripheral segment has been inserted into and through the access opening, the means assumes the first mode within the interior cavity of the elongated member. The device includes an element which engages a concealed surface portion of the elongated member and coacts with the exposed flange of the ceiling support effecting securement of the elongated member to the exposed flange.

DESCRIPTION

For a more complete understanding of the invention, reference is made to the drawings wherein:

FIG. 5 is a fragmentary perspective view of a room interior looking towards the ceiling and showing how the elongated member of FIG. 1 is manually assembled with the clips previously installed on a ceiling support exposed flange.

FIG. 5A is an enlarged fragmentary end view showing the clip engaging the exposed flange of the ceiling support and the elongated member being pushed into interlocking engagement with the clip.

FIG. 5B is a fragmentary perspective view showing how the upper peripheral edge of the depending unit is to be assembled with the elongated member.

FIG. 6 is similar to FIG. 2 but showing a second form of the attaching device.

FIGS. 7-9 are enlarged side, top, and end views, respectively of a clip per se forming a component of a third form of the attaching device.

FIG. 10 is an enlarged end view of an elongated member per se adapted to be assembled with the clip shown in FIGS. 7-9.

FIG. 11 is similar to FIG. 10 but showing a modified elongated member per se which is adapted to be assembled with the clip shown in FIGS. 7-9.

Figure 1:
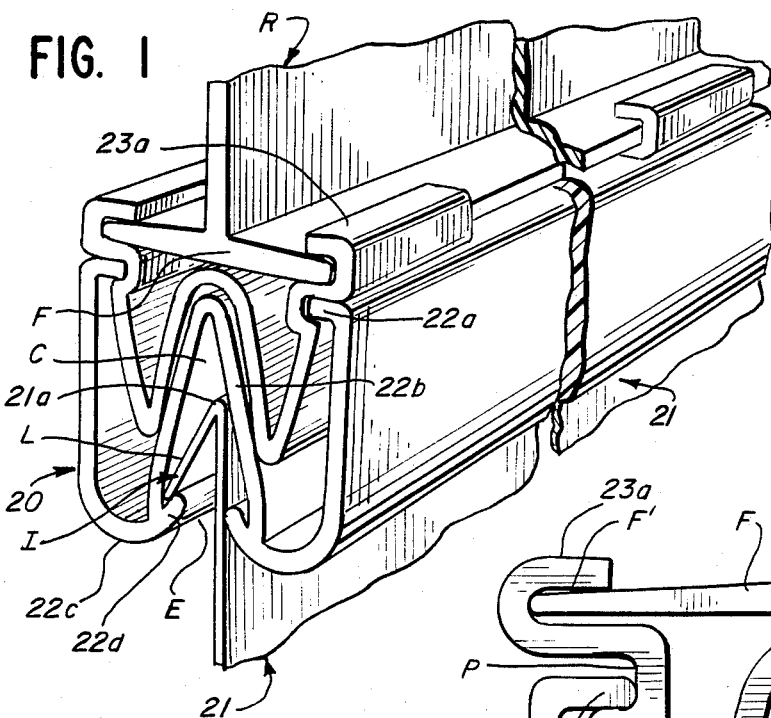
FIG. 1 is an enlarged fragmentary perspective view showing one form of the device attached to the exposed flange of a ceiling support and with a depending unit suspended from the device.

Referring now to the drawings and more particularly to FIG. 1, a preferred embodiment of an attaching device 20 is shown which is adapted for use in securing a depending unit 21 to the exposed flange F of a conventional T-runner R commonly utilized in a suspended ceiling construction, see FIG. 5. In such a ceiling construction, a plurality of runners are utilized to form a lattice suspended from rafters or the like by wires or straps, not shown. Positioned within each space of the lattice delimited by the runners are conventional ceiling tile X which have peripheral portions thereof resting upon and supported by a segment F' of the exposed flange F, see FIG. 3. Such a suspended ceiling construction is well known and forms no part of the claimed invention. The runners R are normally extruded from suitable plastic or metallic material.

The depending unit 21 in the illustrated embodiment may be a poster or graphic piece which is formed from a sheet of foldable paper stock material commonly used for posters and the like. The upper edge 21a of the unit 21 is folded over so as to form a return lip L. Because of the inherent fight-back of the foldable material, the lip L normally assumes an angular outwardly extending position I, see FIG. 1, which is referred to herein as an expanded mode. The lip L may be approximately ½" in width and have a length coincident to the upper edge of the unit. It is to be understood, of course, that invention herein described and claimed is not intended to be limited for use only with the depending unit 21, as illustrated. Other types of depending units such as banners, mobiles, and the like may be substituted for the illustrated unit 21. Whatever the type of depending unit involved, it is important that the upper edge or end portion thereof be of such dimension that said edge or end portion is capable of being assembled with the attaching device when the edge or end portion of the depending unit assumes a first mode with respect to the device as will be more fully described hereinafter.

Figure 2:
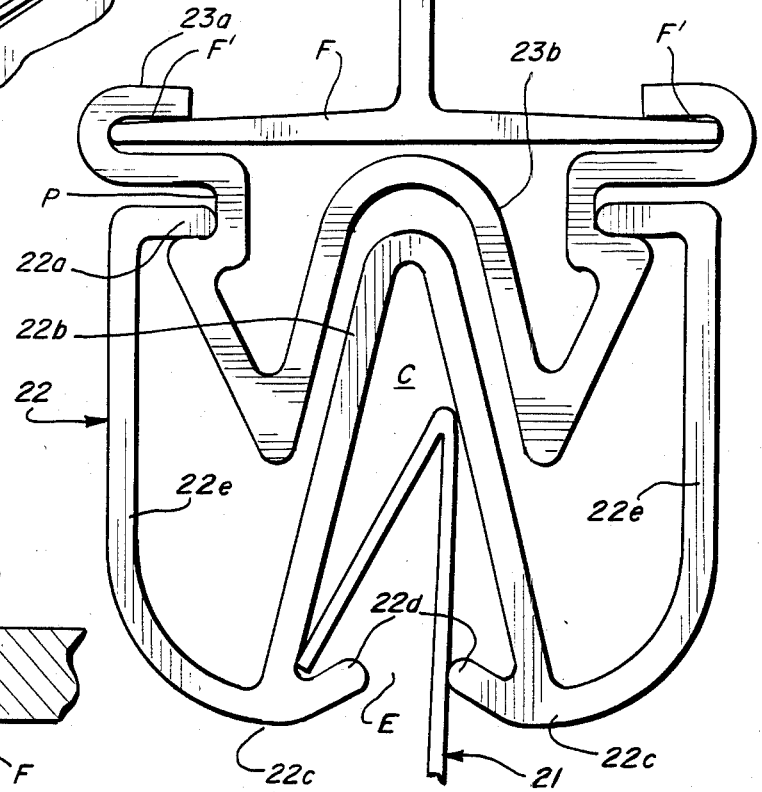
FIG. 2 is an enlarged fragmentary end view of the ceiling support, the attaching device and the depending unit shown in FIG. 1.

As seen in FIGS. 1 and 2, the preferred embodiment of the attaching device 20 includes the following basic components: an elongated member 22 extruded from a suitable plastic material and a plurality of clips 23 arranged in longitudinally spaced relation along the exposed runner flange F. The clips may also be extruded from a suitable plastic or metallic material. Because the elongated member is exposed to view when assembled with the clips, which had been previously attached to the ceiling runner R, the member 22 may be formed of various colored plastic material and/or surface indicia which will be esthetically pleasing with either the ceiling color or the color of the unit 21 depending therefrom.

Each clip 23, as seen in FIG. 2, is provided with a pair of opposed jaws 23a which are adapted to resiliently engage corresponding edge portions of the exposed flange F of the runner R. The jaws are interconnected to one another by a resilient tortuous channel-like center portion 23b. As noted in FIG. 2, each juncture between a jaw 23a and the center portion 23b defines a recessed pocket P which is adapted to accommodate a shoulder 22a formed on the elongated member 22 when the latter is properly assembled with the clip. The center portion 23b is provided with a central recess 23c which facilitates distorting the clip during attaching or detaching the clip with respect to the runner flange F, see FIG. 3. In addition, the recess 23c also permits a portion 22b of the member 22 to be nested therein when the member 22 is assembled with the clips, see FIG. 2. External surface segments of the center portion 23b of each clip are tapered and serve to facilitate relative movement of the elongated member 22 into interlocking engagement with each clip 23. The number of clips and their relative location on the flange F will depend upon the length of the elongated member 22. If desired, several elongated members of the same or varying lengths may be attached to the same exposed flange. In such a case the elongated members are normally arranged in spaced endwise relation to each other. The number and length of the elongated members 22 attached to a given exposed flange will depend upon the visual effect of the suspended units 21 desired within a given room or store.

The elongated member 22, as seen in FIG. 2, is provided with an elongated interior cavity C which is preferably formed in the central portion 22b. Normal access to the cavity is provided by an elongated narrow opening or entry E formed in the exposed underside 22c of the elongated member 22. The opening E is defined by a pair of opposing ledges 22d which project generally towards one another. The opening E is sized so as to allow the folded upper edge 21a of the unit 21 to readily pass therethrough into the cavity C when the lip L is in a first mode, that is to say, it is substantially collapsed or folded against one surface of the remainder of the unit 21. In instances wherein the unit 21 has another type of element (e.g., a hooklike piece) for attaching to the elongated member, it might be necessary to position the hooklike piece in a predetermined first mode position with respect to the opening E whereby the end portion thereof will readily pass therethrough and then once within the cavity the piece is rotated approximately 90° to a second mode so that the end portion will engage or hook onto one of the ledges 22c and, thus, prevent the hooklike piece being disengaged therefrom while in the second mode position.

Where, however, the upper peripheral edge 21a of the depending unit 21 is folded over as shown in FIG. 2, the lip L will automatically spring outwardly to the second mode position within the cavity once the lip L has cleared the ledges 22c and the lip L will engage the concealed surface of one of the ledges thereby preventing withdrawal of the inserted upper peripheral edge of the depending unit through the opening E. It is necessary that the height of the cavity C be sufficient to enable the lip L to clear opening ledges 22c.

An alternative way of assembling the upper peripheral edge of the depending unit within the cavity C is to insert one end of the folded upper peripheral edge into an open end of the elongated cavity C and simultaneously insert a corresponding edge of a depending portion of the unit 21 into an end of opening E and then slide the unit endwise of the elongated member 22 until it is properly aligned with respect to the member 22.

The shoulders 22a of the elongated member 22 are formed at the upper edges of side sections 22e, which in turn terminate at their lower edges at the ledges 22d defining the opening E. The exterior surfaces of the side sections 22e are exposed to view when the elongated member 22 is attached to clip 23 and thus, may have graphic indicia or a surface texture or shape which is esthetically pleasing.

Figure 3:
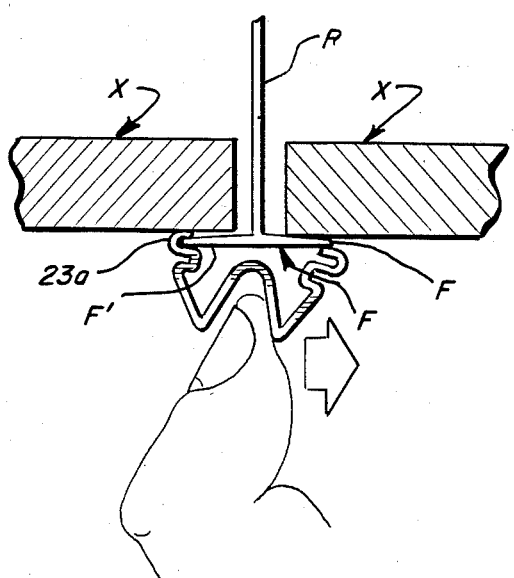
FIGS. 3 and 4 are fragmentary end views of the ceiling support showing how the clip of the device of FIG. 2 is manually attached to the exposed flange of the ceiling support.
Figure 4:
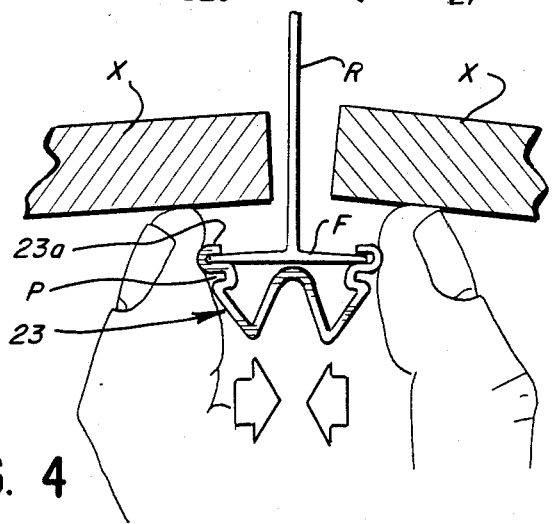

When attaching the device 20 to the exposed flange F of a selected ceiling runner R, one of the clip jaws 23a is positioned so that the edge of one of the flange segments F' is accommodated therein, see FIG. 3. To facilitate such accommodation, the ceiling tile X resting upon the flange segment F' is raised slightly off the segment F'. Once one of the jaws 23a is accommodating the flange segment, thumb pressure is exerted on the center portion 23b of the clip in the direction indicated by the arrow in FIG. 3 until the other jaw 23a clears the outer edge of the other flange segment F', whereupon as the thumb pressure is released, the other flange segment will be automatically accommodated by the other clip jaw. As previously noted, the clip center portion 22b is shaped so as to impart resiliency to the clip jaws. If desired, the flange segments F' can be fully accommodated by the clip jaws, by the latter being manually squeezed together onto the flange segments F' in a manner as illustrated in FIG. 4.

Because of the configuration of the clip center portion 23b, the jaws are capable of accommodating flanges of various dimensions. Once the appropriate number of clips are attached to the exposed flange, they may be shifted along the flange to the desired locations. Once the clips are in the desired locations, the elongated member 22 is manually pushed into place with the pre-positioned clips, see FIGS. 5 and 5A. To facilitate pushing the member 22 into place, the member 22 is hand-held so that the projecting center portions 23b of the clips are located in the spacing between the shoulders 22a of the member and then an upward pushing force is exerted on the underside of the member in a direction as shown by the arrows in FIG. 5A. As the upward pushing force is exerted on member 22, the tapered side surface portions of the clip center portions 23b will deflect inwardly a slight amount and the shoulders 22a of the member 22 will deflect outwardly a slight amount until the shoulders 22a are aligned with the pockets P in the clips, whereupon the shoulders will snap into interlocking engagement with the corresponding pockets. Once the elongated member is assembled with the clips, the folded over upper peripheral segment 21a of the depending unit 21 is pushed up through the opening E until the lip L of the unit 21 clears the ledges 22d of member 22 and is free to spring outwardly so that the free elongated edge of the lip will rest against the concealed surface of one of the ledges, see FIG. 1.

In certain instances, as seen in FIG. 5B, it might be more desirable to insert the unit upper peripheral segment through the opening E before the member 22 is connected to the clips. In this latter situation, the depending portion of the unit 21 is deflected to one side while the pushing force is exerted on the member 22, so as to effect connection between the clips 23 and the member 22.

A modified form of attaching device 120 is shown in FIG. 6, wherein the ceiling T-runner is formed of a ferrous metal. In such a situation, the clip 23 may be replaced by a magnetic strip M which is secured to the concealed surface portion of the elongated member 122. The magnetic strip M will readily be attracted to the exposed flange of the selected runner and hold the elongated member 122 in the desired location. If the elongated member 122 is formed of a ferrous metal, the magnetic strip or strips can be secured to predetermined locations on the exposed flange F and the elongated member 122 will be attracted to the magnetic strip or strips on the flange and be held in place thereby against the flange.

In lieu of the shoulders 22a of the elongated member 22, the elongated member 122 has a planar concealed surface 122a so as to provide greater surface for the magnetic strip M. The remainder of the elongated member 122 has a modified appearance, as will be noted, and includes a pair of depending, spaced, substantially parallel sides 122e having the lower edges thereof terminating in inwardly extending ledges 122d. The spacing between the inner ends of the ledges forms the opening E to the interior cavity C formed between the sides 122e. The ledges 122d, opening E, and cavity C of member 122 function in the same way as previously described with respect to member 22 in retaining the upper peripheral segment of the depending unit in assembled relation with the device 120.

FIGS. 7-9 illustrate a clip 223 which forms a component of a modified form of the device 220. The clip 223 may be formed of a suitable plastic material and is provided with a pair of flange-engaging jaws 223a. As noted in FIG. 7, the jaws 223a are offset or staggered relative to one another and project from one surface of a substantially flat center portion 223b. The center portion 223b will subtend and rest against the exposed flange F of the selected ceiling runner R when the clip 223 is properly attached thereto. Projecting downwardly from the opposite surface of the center portion 223b is a centrally disposed stud 223g with an enlarged head H. The head of the stud is adapted to interlockingly engage an elongated member 222 or 322, as will be described more fully hereinafter.

As noted in FIG. 7, the diagonally measured spacing Y between the staggered jaws 223a is greater than the width dimension of the runner exposed flange F so that when the clip 223 assumes an askewed position relative to the flange F wherein the latter is aligned with the spacing Y, the clip 223 can be pushed upwardly so that the flange will pass between the jaws until the flange engages the clip center portion 223b whereupon the clip is twisted or rotated relative to the flange until the clip is aligned with the runner flange. When the clip 223 is rotated into the aligned position, the jaws 223a will interlockingly engage the peripheral portions of the flange.

The elongated members 222 and 322 shown in FIGS. 10 and 11, respectively, are adapted to be utilized with clip 223, shown in FIGS. 7-9. Each elongated member has formed in the concealed surface thereof an elongated slot S which is configured to receive the head H of the stud 223g. The slot S is formed in part by a pair of opposed shoulders 222a, 322a which coact to form a throat portion T of the slot S which is adapted to slidably accommodate a necked portion N of the stud 223g which connects the head H of the stud to the center portion 223b of the clip 223.

To assemble the elongated member 222, 322 to the clip 223, the head H and neck N of the stud is inserted into the slot S and throat T at one end of the elongated member 222, 322 and then the member is manually moved endwise causing the head H and neck N to slide along the slot and throat. The size of the head H is such that it will not pass through the throat T.

Both members 222 and 322 are provided with depending sides 222e, 322e which terminate in either inwardly extending ledges 222d or resilient auxiliary jaws 322d. The ledges 222d of member 222 function in the same manner as the ledges previously described with respect to member 22 or 120. In member 322, the auxiliary jaws 322d have serrated or roughened mating surfaces Z which frictionally engage the upper peripheral segment of the depending unit when the latter is inserted between the mating surfaces Z. The jaws 322d are connected to the corresponding sides 322e by springlike arm sections W which urge the jaws 322d towards one another. The sections W converge towards the jaws and thus, serve to guide the upper peripheral segment of the depending unit between the jaw mating surfaces Z.

While several configurations and shapes of the elongated member and the element for connecting same to an exposed flange have been illustrated and described, still further variations thereof are contemplated and are deemed to come within the scope of the invention. For example, where the room has a high ceiling, the clips, rather than being secured directly to the exposed flange of a selected support, may be suspended therefrom by suitable wires or tapes. In such a situation each clip must be supported by one hand of the installer while the other hand pushes the elongated member into interlocking engagment with the clip.

Thus, an attaching device has been provided which is simple to install on an exposed flange of a ceiling support without the need for tools or the like. The device is attractive in appearance and can be utilized with a wide variety of depending units such as posters, banners, signs, mobiles, etc., without causing defacement or damage to the unit, the device, or the ceiling to which it is attached. In addition, the device is sturdy, inexpensive, and is capable of being reused.

We claim:

1. The combination of a plurality of elongated ceiling supports, each having an exposed surface portion, an elongated device for attaching a depending unit to the exposed surface portion of a selected ceiling support, and means for magnetically securing a surface portion of said device to the exposed surface portion of said selected ceiling support, at least one of the surface portions being of ferrous metal; said device being provided with an elongated interior cavity accessible at least through an elongated, narrow opening formed in the exterior of said device, said cavity being provided with an internal ledge, said ledge being adapted to be engaged by a peripheral segment of the depending unit wherein the peripheral segment is retained within the cavity and is impassable relative to the elongated opening.

2. A device for attaching a depending unit to a ceiling having a support with an exposed flange, the depending unit being provided with a thin upper peripheral segment with means for adjustment from a first mode to a second mode; said device comprising an elongated member provided with an elongated cavity, said member having an exposed surface portion provided with a narrow access opening to said cavity through which the upper peripheral segment of the unit is adapted to be inserted when the means thereof is in the first mode, the means assuming the second mode when disposed within the cavity effecting retention of the upper peripheral segment in assembled relation with the elongated member; and a clip engaging a concealed surface portion of the said elongated member and adapted to coact with the support exposed flange to secure thereto the elongated member, said clip having a section for substantially embracing peripheral segments of the support exposed flange, and a studlike protuberance having a necked distal end portion accommodated in an elongated slot with a narrow throat formed in the concealed surface portion of said elongated member.

3. The device of claim 2 wherein the first section of the clip includes a pair of jaws arranged in staggered relation, whereby when said clip assumes an askewed first relative position with respect to the exposed flange, the latter can pass between said jaws when said clip is moved towards the flange and, when said clip is turned relative to the exposed flange, subsequent to the latter passing between the jaws, in a predetermined direction from the first relative position so as to assume a substantially aligned second relative position with respect to the exposed flange, said jaws interlockingly engage peripheral edge segments of the flange disposed therebetween.

4. A device for attaching a depending unit to a ceiling having a support with an exposed flange, the depending unit being provided with a thin upper peripheral segment with means for adjustment from a first mode to a second mode; said device comprising an elongated member having a concealed surface portion provided with inwardly projecting shoulders and an exposed surface portion provided with an elongated cavity with a narrow access opening through which the upper peripheral segment of the unit is adapted to be inserted when the means thereof is in the first mode, the means assuming the second mode when disposed within the cavity and effecting retention of the upper peripheral segment in assembled retention with the elongated member; and a clip engaging the concealed surface portion of said elongated member and adapted to coact with the support exposed flange to secure thereto the elongated member, said clip including a pair of spring jaws for resiliently embracing peripheral segments of the support exposed flange, and a projecting section having tapered external surface portions, the exterior segments of said tapered external surface portions adjacent said jaws being provided with recessed pockets for interlockingly accommodating the inwardly projecting shoulders of said elongated member when said clip and elongated member are in assembled relation; the shoulders of said elongated member being relatively spaced from one another and forming an opening through which the clip projecting section extends when said clip is assembled with said elongated member.

5. The device of claim 4 wherein a plurality of clip-like elements are arranged in longitudinally spaced relation and are provided for resiliently securing the elongated member to the exposed surface of the ceiling support, the spacing between the endmost clip-like elements securing said elongated member to the exposed surface being less than the length of said elongated member.

* * * * *